Jan. 25, 1966     E. L. SHERWOOD ET AL     3,230,862

COUNTER MOUNTED ELECTRIC TOASTER

Filed Oct. 9, 1963

Earl L. Sherwood
Kenneth L. Sherwood
INVENTORS

BY Oliver D. Olson

Agent

United States Patent Office 3,230,862
Patented Jan. 25, 1966

3,230,862
COUNTER MOUNTED ELECTRIC TOASTER
Earl L. Sherwood, 1947 Eola Drive, and Kenneth L. Sherwood, 3165 Marcia Drive NE., both of Salem, Oreg.
Filed Oct. 9, 1963, Ser. No. 314,917
5 Claims. (Cl. 99—391)

This invention relates to electric toasters, and more particularly to an electric toaster unit adapted to be mounted in a counter top.

It is the principal object of the present invention to provide an electric toaster unit which is capable of being mounted in a counter top in such a manner that when it is not in use the upper surface thereof is substantially coplanar with the counter top and thus permits unobstructed use of the latter.

Another important object of this invention is the provision of an electric toaster unit which is adapted to be mounted in a counter top and in which means are provided at the top of the unit for manipulating the darkness and bread depressor controls of a conventional electric toaster mechanism.

A further important object of this invention is the provision of an electric toaster unit adapted for mounting in a counter top and which unit is of simplified construction for economical manufacture and is capable of installation with speed and facility.

The foregoing and other objects and adavntages of the present invention will appear from the following detailed description, taken in connection with the accompanying drawing in which.

Figure 1:
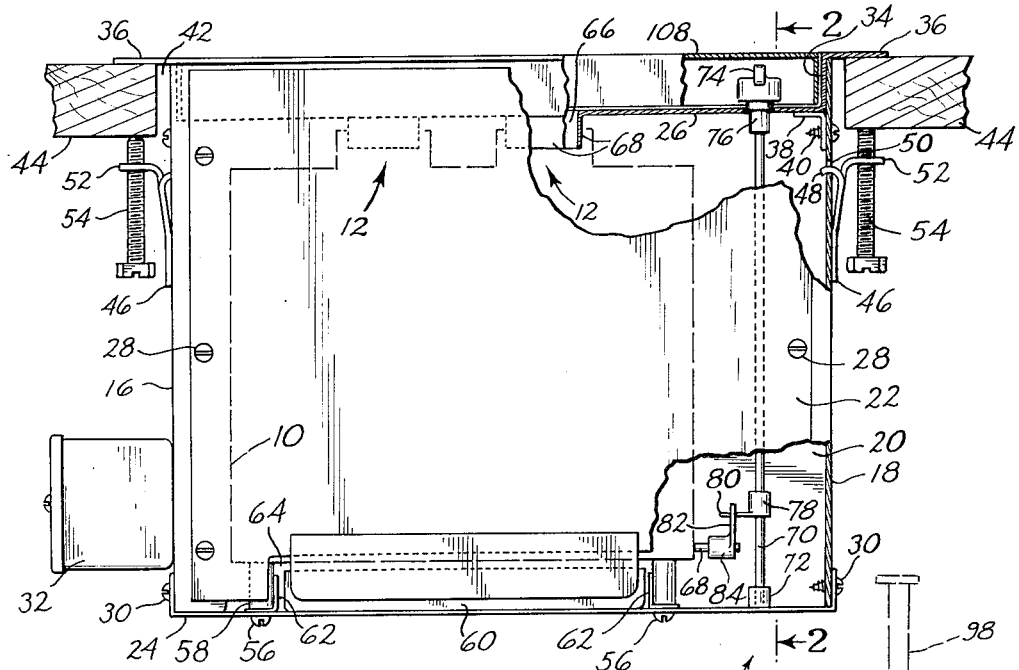
FIG. 1 is a view in side elevation of the toaster unit embodying the features of the present invention, parts thereof being broken away to disclose details of construction.
Figure 2:
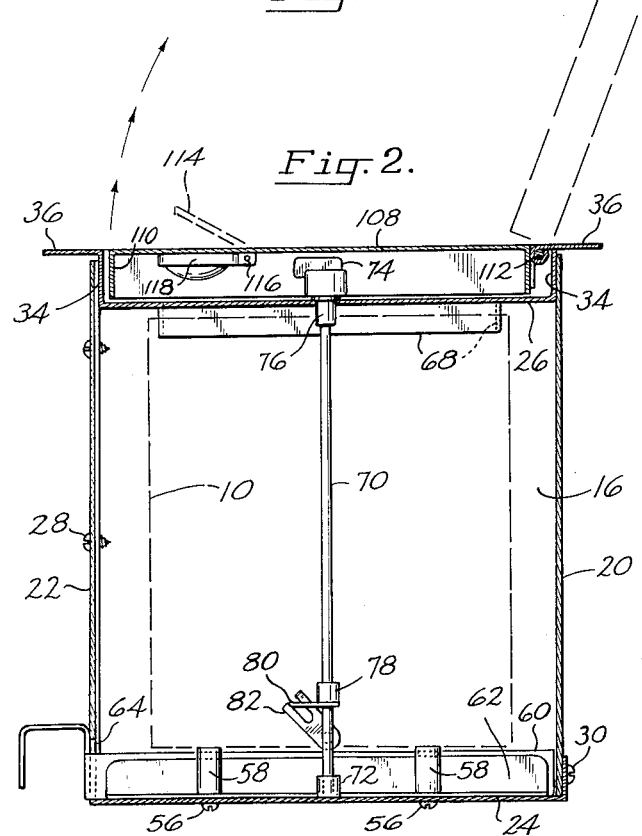
FIG. 2 is a sectional view taken along the line 2—2 in FIG. 1.

The toaster unit of the present invention conveniently incorporates a conventional electric toaster mechanism 10 which may, but preferably does not, include the outer casing. In the embodiment illustrated in FIGS. 1 and 2 the toaster mechanism is of the type which provides for automatic lowering of the bread slices into the heating chamber, through the vertical slots which, as indicated at 12, are open at the top end of the toaster. In the embodiment illustrated in FIG. 3 the toaster mechanism is of the type which includes a manually operated bread depressor tab 14 which projects laterally outward from a side of the toaster for manual movement vertically downward for lowering the bread slices into the heating chamber.

The toaster mechanism is contained within a housing which includes the side walls 16 and 18, rear wall 20, front wall 22, bottom wall 24 and top wall 26. In the embodiment illustrated the side and rear walls are formed as an integral unit by appropriate bending of a single piece of sheet metal. The front wall is rendered removable by its attachment to inwardly projecting front sections of the side walls, as by the screws 28. The bottom wall is provided with upstanding wall sections adjacent the side and rear walls, for connection with the latter by means of the screws 30.

The conventional toaster mechanism 10 includes electrical heaters (not shown) which are connected to the terminal box 32 mounted on the outer side of the housing. The terminal box, in turn, is connected by conventional means to the usual source of electric supply.

The top wall 26 includes a peripheral vertical section 34 which nests within the upper portions of the vertical walls of the housing, and a peripheral flange 36 which projects laterally outward over the top ends of said vertical walls. The top wall thus is recessed below the top ends of the vertical walls, and is secured to the latter walls by such means as the angle brackets 38, one angle of which is secured to the top wall as by welding, and the other angle of which is secured to the vertical wall by such means as the screws 40.

The housing is adapted to be received through an opening 42 in a counter top 44, with the peripheral flange 36 overlying the counter top. The peripheral flange thus serves to close the opening in the counter top and also serves to support the toaster housing in suspended position below the counter top.

Means is provided for securing the housing in mounted position in the counter top. In the embodiment illustrated, this means comprises a pair of clamp members, one associated with each of the side walls of the housing. Each clamp member comprises an elongated flat bar 46 provided at one end with a pair of laterally spaced inturned hooks 48 which are adapted to be received freely through correspondingly spaced openings 50 in the associated housing side wall. By this means the bar is supported freely on the side wall, the main portion of the bar depending downwardly from the hook along the outer side of the wall. The bar also is provided with a tab 52 which projects laterally outward from the same end as the hooks, and the tab is provided with a threaded opening for adjustably receiving the threaded clamp screw 54. The clamp screw extends substantially parallel to the bar, vertically below the peripheral flange 36, for adjustment toward and away from the latter. Thus, the upper end of the screw is positioned for engaginng the under side of the counter top to clamp the latter between the peripheral flange and screw.

The toaster mechanism 10 is secured within the housing by means of the anchor screws 56 which extend upward through the bottom wall 24 of the housing and are engaged in threade openings in the bottom of the toaster mechanism. The screws extend through spaced sleeves 58 which are interposed between the toaster mechanism 10 and bottom wall 24, to provide a space therebetween for the removable crumb tray 60 which underlies the open bottom ends of the bread slice slots 12 in the toaster mechanism. The crumb tray is oriented properly in relation to these slots, by free confinement between laterally spaced guides which, in the embodiment illustrated, comprise angle brackets 62 which are secured to the bottom wall 24 of the housing by means of the screws 56. The front wall 22 of the housing is notched at its lower end to provide an opening 64 for the tray.

The top wall 26 of the housing is provided with an opening 66 registering with each of the bread slice slots 12 in the toaster mechanism. In the embodiment illustrated, these openings are defined by down turned sections 68 of the top wall, which sections are received freely within the upper ends of the slots and serve to guide the bread slices into and out of the toaster.

As indicated hereinbefore, conventional electric toasters include a control for varying the degree of darkness of toast. This control includes a rotary shaft 68 which projects laterally outward from the toaster mechanism, and the casing normally enclosing the latter, and is ordinarily fitted with a control knob. For purposes of the present invention means is provided for manipulating this rotary shaft from the remote position of the top wall 26 of the unit. In the embodiment illustrated, this remote control includes an elongated shaft 70 which is journaled at its lower end for rotation in the socket bearing 72 mounted on the bottom wall of the housing, and extends vertically upward therefrom. A control knob 74 located above the top wall 26 of the housing is provided with a hub section 76 which extends freely through an opening in the top wall, and this hub section is provided with a bore which frictionally receives therein the top end of the shaft 70. Thus, the shaft may be rotated by manual rotation of the knob 74.

Secured to the shaft is a collar 78 provided with a radially projecting pin 80. This pin is confined freely between the spaced fingers of a slotted arm 82 which projects radially from a collar 84 secured to the rotary shaft 68 of the darkness control of the toaster mechanism.

Thus, by rotation of the control knob 74 above the top wall 26 of the housing the rotary shaft 68 of the darkness control is caused to rotate between its limits.

Figure 3:
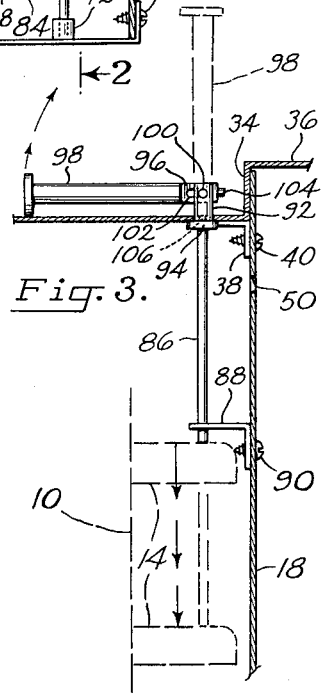
FIG. 3 is a fragmentary sectional view in side elevation showing a form of bread depressor mechanism forming a part of this invention.

Also, as indicated hereinbefore, some conventional electric toasters are provided with manual means such as the vertically movable tab 14 illustrated in FIG. 3, for lowering bread slices into the toaster. For purposes of the present invention, means is provided for manipulating this tab from the remote position of the top wall of the housing. In the embodiment illustrated in FIG. 3, this means includes the elongated rod 86 which bears at its lower end on the tab 14 and is guided for vertical movement by the apertured bracket 88 secured to the side wall of the housing as by means of the screw 90. The upper end of this rod is provided with the enlarged section 92 which extends slidably through an opening in the top wall 26 of the housing. A shoulder 94 between these sections of the rod is positioned for abutment against the under side of the top wall 26 when the tab 14 is in its uppermost position, to prevent disengagement of the rod from the guide bracket.

The enlarged section 92 of the rod which projects upwardly from the top wall of the housing is slotted diametrically to receive the flattened end portion 96 of the plunger rod 98. These sections are joined together pivotally by means of a pin 100 which extends through a longitudinally elongated slot 102 in the flattened section of the plunger rod and the registering openings in the enlarged section 92. The elongated slot permits the plunger rod to be pivoted from the retracted position shown in full lines in FIG. 3 to the operative position shown in dash lines, whereupon the plunger rod may be lowered to seat the pin 104, projecting from the end of the flattened section, in the socket 106 formed in the enlarged section 92. By this means the plunger rod forms a stable extension of the elongated rod 86, whereupon the plunger rod may be depressed to lower the tab 14 for lowering a bread slice into the toaster.

It is to be noted that the darkness control knob 74 and the retracted plunger rod 98 are positioned above the top wall 26 of the housing but below the plane of the peripheral flange 36. This is an important feature of the present invention, since it permits the incorporation of a cover 108 to removably close the space above the top wall and to provide a substantially continuous surface coplanar with the peripheral flange. In this manner there is provided a substantially uninterrupted working surface over the toaster unit substantially coplanar with the counter top, when the toaster is not in use.

In the embodiment illustrated, the cover is provided with a peripheral downturned wall 110 for reinforcement, and is secured pivotally to the rearward section of the peripheral flange by such means as the piano hinge 112. The downturned peripheral wall of the cover rests upon the top wall of the housing, when in closed position, so that the cover is substantially coplaner with the peripheral flange. The cover may be swung upward and rearward to the open position illustrated in dash lines in FIG. 2, to expose the top wall 26 for insertion of bread slices through the openings 66 as well as to accommodate manipulation of the control knob 74 and plunger rod 98.

Handle means is provided to facilitate opening of the cover 108. In the embodiment illustrated, this means comprises an annular ring-shaped pull member 114 mounted pivotally in a recessed portion of the cover, by means of the pivot pin 116. The pull member normally remains retracted into a pocket 118 formed in the cover, and is adapted to be engaged by a finger and pivoted upward as indicated in dash lines in FIG. 2.

It will be apparent from the foregoing that the present invention provides a toaster unit designed particularly to be built into a kitchen counter top, so that when the toaster is not in use, the space occupied by it provides a continuous work surface substantially coplanar with the counter top. The toaster unit incorporates a conventional toaster mechanism and provides simplified means for operating the toaster controls from the remote position of the top of the unit. The toaster unit is of simplified construction for economical manufacture and is capable of installation in and removal from a counter top with speed and facility.

It will be apparent to those skilled in the art that various changes may be made in the structural details described hereinbefore without departing from the spirit of this invention and the scope of the appended claims.

Having now described our invention and the manner in which it may be used, what we claim as new and desire to secure by Letters Patent is:

1. An electric toaster unit adapted for flush mounting in a counter top, comprising:
    (a) an electric toaster mechanism defining at least one bread-receiving slot extending inwardly from its top end and having a darkness control projecting laterally outward from one of its sides,
    (b) a toaster mechanism housing having side walls, a bottom wall and a top wall, the top wall being recessed below the upper ends of the side walls,
    (c) mounting means on the housing securing the toaster mechanism therein below said recessed top wall,
    (d) the top wall having an opening therein registering with each bread-receiving slot in the toaster mechanism,
    (e) a peripheral flange projecting laterally outward from the upper end of the toaster housing for mounting on a counter top adjacent an opening in the latter through which the toaster housing is receivable,
    (f) securing means on the toaster housing releasably engageable with the counter top for securing the toaster housing thereto,
    (g) a cover hinged to the toaster housing for movement between a closed position overlying the housing top wall substantially coplanar with the peripheral flange, and an open position exposing the top wall,
    (h) a darkness control member disposed above the housing top wall and below the closed position of the cover, and
    (i) connector means extending through the housing top wall and operatively connecting the darkness control member to the darkness control of the toaster mechanism.

2. The toaster unit of claim 1 wherein the securing means comprises a pair of clamp members one associated with each of opposed side walls of the housing and each comprising an elongated bar having adjacent one end an inwardly directed hook receivable freely in an opening in the associated housing side wall and an outwardly directed tab having a threaded opening adjustably mounting a threaded clamp screw substantially parallel to the bar for engagement with the under side of a counter top.

3. The toaster unit of claim 1 wherein the darkness control of the toaster mechanism includes a rotary shaft projecting laterally outward from one side of the toaster mechanism, the darkness control member comprises a hand knob, and the connector means comprises a rotary shaft supporting the hand knob at one end and operatively coupled to the rotary shaft of the darkness control of the toaster mechanism.

4. The toaster unit of claim 1 wherein the electric toaster mechanism also has a bread depressor projecting laterally outward from one of its sides, and the unit includes a bread depressor control member disposed above the housing top wall and below the closed position of the cover, and connector means extending through the housing top wall and operatively connecting the bread depressor control member to the bread depressor of the toaster mechanism.

5. The toaster unit of claim 4 wherein the bread depressor of the toaster mechanism includes a vertically movable tab projecting laterally outward from one side of the toaster mechanism, the bread depressor control member comprises a plunger rod, and the connector means comprises a connecting rod mounted in the housing for vertical movement, the lower end of the connecting rod engaging the vertically movable tab and the upper end of the rod extending through the top wall of the toaster and pivotally supporting the plunger rod thereon for movement between an operative position extending coaxially with the connecting rod and a retracted position laterally of the connecting rod between the top wall and closed position of the cover.

References Cited by the Examiner
UNITED STATES PATENTS

| | | | |
|---|---|---|---|
| 1,941,214 | 12/1933 | Kusterle. | |
| 2,440,324 | 4/1948 | Blakeslee | 248—27 |
| 2,486,906 | 11/1949 | Altman et al. | 99—391 XR |
| 2,504,445 | 4/1950 | Pavnica | 99—393 XR |
| 2,667,828 | 2/1954 | Koci | 99—391 XR |
| 3,023,635 | 3/1962 | Ballmer | 74—479 XR |

WALTER A. SCHEEL, *Primary Examiner.*

JEROME SCHNALL, *Examiner.*